United States Patent [19]

Hogshead, III et al.

[11] Patent Number: 4,682,642
[45] Date of Patent: Jul. 28, 1987

[54] FASTENER FOR PLASTIC FILM SHEETING

[76] Inventors: Rodney C. Hogshead, III, 1331 Carlton St., Longwood, Fla. 32750; Giles Van Duyne, Jr., 3042 Holliday Ave., Apopka, Fla. 32703

[21] Appl. No.: 806,391

[22] Filed: Dec. 9, 1985

[51] Int. Cl.⁴ ............................................. A47H 13/00
[52] U.S. Cl. .................................... 160/392; 160/395; 24/460
[58] Field of Search ................ 160/392, 393, 394, 395, 160/396, 397, 391, 386, 382, 383, 384, 385; 24/460, 462; 52/202, 203, 222

[56] References Cited

U.S. PATENT DOCUMENTS

| | | | |
|---|---|---|---|
| 2,526,912 | 10/1950 | Swanson | 160/392 X |
| 3,719,013 | 3/1973 | Blick | 160/395 X |
| 3,805,873 | 4/1974 | Bloomfield | 160/392 |
| 3,848,380 | 11/1974 | Assael | 160/395 X |
| 3,893,212 | 7/1975 | Curry | 24/462 |
| 4,193,235 | 3/1980 | Cucchiara | 52/202 |
| 4,231,141 | 11/1980 | Derrick et al. | 160/380 X |
| 4,233,790 | 11/1980 | Meadows | 24/462 X |
| 4,370,792 | 2/1983 | Watts | 160/392 X |

Primary Examiner—Ramon S. Britts
Assistant Examiner—David M. Purol
Attorney, Agent, or Firm—Macdonald J. Wiggins

[57] ABSTRACT

A system for securing the edges of plastic sheeting or the like is formed from metallic extrusions using three elements: a base element; an intermediate element; and a cap element. The base element is mounted to the surface to which the sheeting is to be attached and the cap element is placed over the sheeting and interlocks with the base element. If multiple sheets of plastic film are to be secured, intermediate elements may be used with the cap element installed to secure the top sheet. Tension on the sheetings serves to lock the elements in place.

14 Claims, 8 Drawing Figures

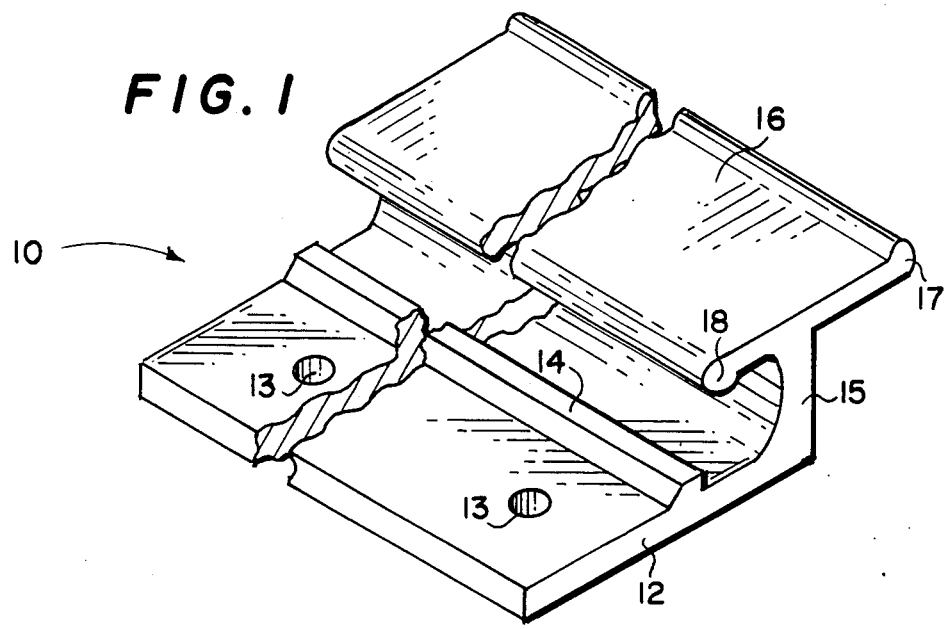
FIG. 1
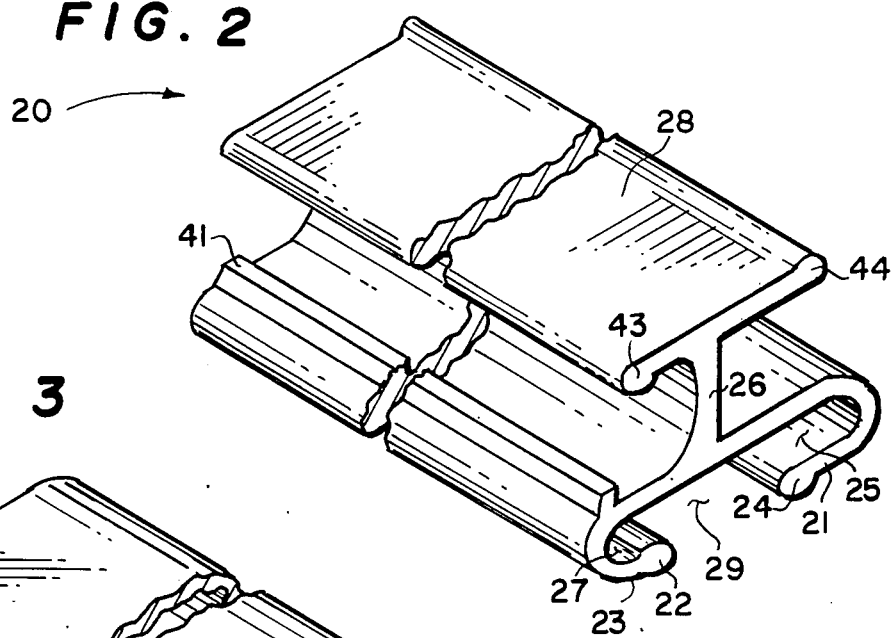
FIG. 2
FIG. 3
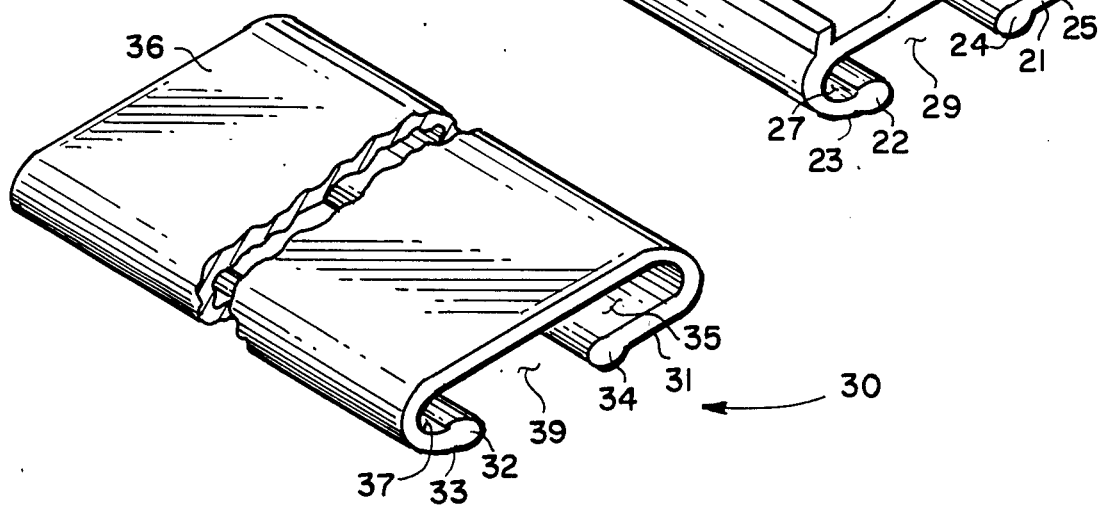

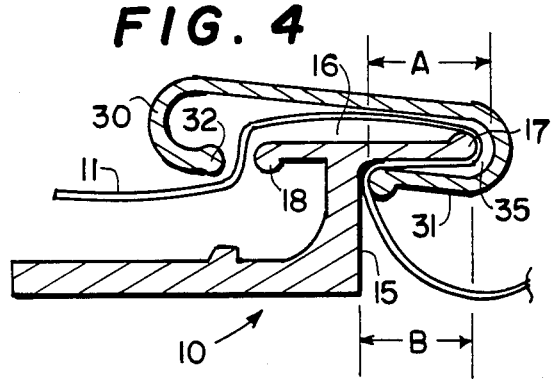
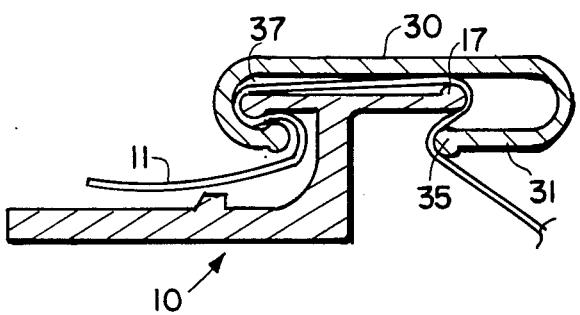
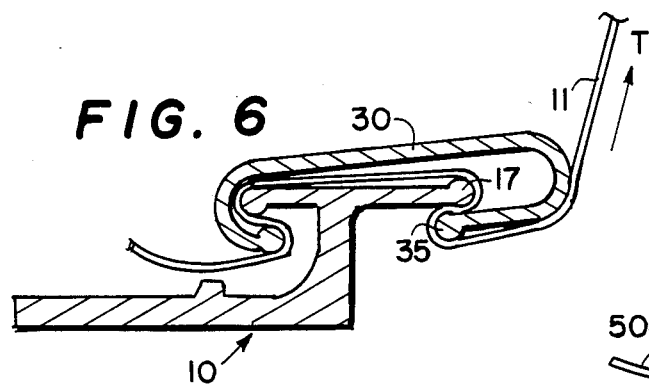
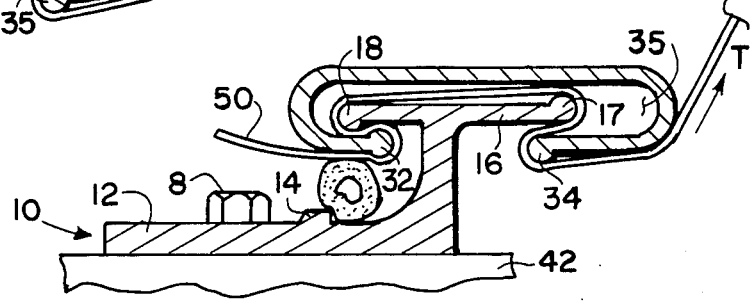
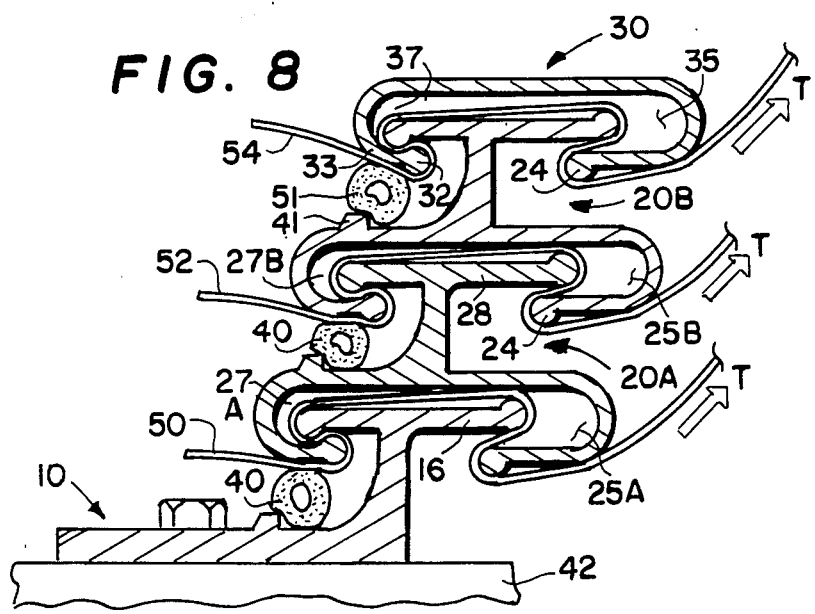

FASTENER FOR PLASTIC FILM SHEETING

BACKGROUND OF THE INVENTION

1. Field of the Invention

The present invention relates to fastening systems for flexible plastic sheeting, and more particularly to a system for fastening multiple layers of plastic sheeting along an edge thereof.

2. Background of the Invention

The use of polyethylene film and other thin pliable plastic films is widespread, especially in the greenhouse industry. It is common to build a greenhouse framework from metal or the like and to temporarily cover the framework with polyethylene film or other type of plastic sheeting. It is desired to install and remove such film frequently; for example, in some instances transparent film is desired while at another time opaque film is necessary. The film is subjected to various forces such as wind, pressurization of the greenhouse, and hot air forming between layers of film.

Another requirement is that of having multiple layers of film to produce insulating air spaces to retain heat within the greenhouse. Thus, there is a need for a simple, low cost film fastening system in which various thicknesses or plies of plastic film can be quickly installed, which will be securely held in place when subjected to forces and which can be easily removed when desired. In addition, the system needs to provide for multiple layers of film when required.

There are a number of prior art patents which address this problem; for example, the following U.S. Patents disclose plastic film gripping or holding systems: Daniels U.S. Pat. No. 3,225,407; Blumfield U.S. Pat. Nos. 3,805,873 and 3,987,835; Curry U.S. Pat. No. 3,999,258; Connelly U.S. Pat. No. 4,103,401; Derrick et al U.S. Pat No. 4,231,141, Blumfield U.S. Pat. No. 4,267,876; and Blumfield et al U.S. Pat. No. 4,472,862. The majority of these patents show a rigid, channel member and a resilient core member which may be snapped into the channel member. Such holders depend upon the resiliency of the core member to hold the sheet in place. When exposed to the atmosphere, the resilient members eventually tend to deteriorate and lose their resiliency and therefore do not firmly grip the sheet plastic. The prior art plastic sheet holders are also deficient in that they do not provide for multiple layers of film or are limited to a specific thickness of sheets.

SUMMARY OF THE INVENTION

The present invention is an improved system for securing the edges of polyethylene film plastic sheeting or the like in which the elements are formed from rigid metallic extrusions. The system utilizes three elements: a base element, an intermediate element, and a cap element. Each element is an elongated channel, preferably extruded from aluminum although other rigid materials may be suitable. The base member includes a flat base portion which is to be mounted on the surface to which film is to be attached. A vertical T-shaped portion is integral with one edge of the flat base portion. The top bar of the T-shaped portion presents a planar surface with a bead at each edge thereof. Significantly, the top bar portion is assymmetrical in that one side of the top bar is longer than the other side as will be explained hereinbelow.

The cap element is an elongated channel formed from the same material as the base element. The channel is formed by a planar surface having a 180° short lip along one edge and a longer 180° lip along the other edge, the two lips defining a channel opening. The intermediate member is a combination of the T portion of the base element attached at right angles to the outer planar surface of the cap element.

In one use of the sheet fastening system of the invention, the base element is attached along a surface to which plastic sheeting is to be anchored. The edge of the film to be anchored is placed over the T-bar portion of the base element with the plastic edge folded over the short part of the T-bar portion. The long lip of a cap element may then be hooked over the long portion of the T-bar thereby captivating the film in the channel of the cap element. The opening in the cap element is sufficient that the short lip will clear the short end of the T-bar captivating the free edge of the plastic sheet therebetween. At this point, the cap element is moved toward the long bar of the T as far as it will go and a flexible spline is forced between the cap element short lip and the base portion of the base element. The long lip portion of the cap element will contact the underside of the long portion of the T-bar when tension is placed on the plastic film lifting the cap to tightly catch the film between the cap lip and the underside of the T-bar. As will now be recognized, the greater the tension on the sheet, the more firmly it is held in place. The cap channel spacings are such that several plies of sheeting can be gripped by the cap and the base element.

When the maximum number of plies is installed, additional sheets may be installed along the same line by the use of the intermediate element. The sheeting which is to be attached to the base element is captivated by the channel portion of an intermediate element. Thus, the T-bar portion of the intermediate element is available for another set of plastic sheets which are then captivated by a cap element. Alternatively, as many intermediate elements may be stacked as is required.

When it is desired to remove the plastic sheeting after installation, it is only necessary to remove the flexible spline and relieve the tension on the sheet, at which point the cap element is removed by unhooking the short lip from the T-bar, releasing the sheet edge. This can be done quickly and easily, thereby permitting the user to quickly change from one type of film to the other, or to remove the film completely.

It is therefore a principal object of my invention to provide a plastic film edge fastening system utilizing three simple, rigid, longitudinal elements which permit the film to be quickly attached that grip the film due to tension on the film and which can be quickly released.

It is another object of my invention to provide a film fastening system in which multiple thicknesses of film can be accommodated.

It is still another object of the invention to provide a plastic film fastening system in which fastening elements can be stacked to permit multiple layers of film to be attached.

It is yet another object of the invention to provide a film edge fastening system which will not be affected by exposure to the atmosphere and will not deteriorate with time.

These and other objects and advantages of the invention will become apparent from the following detailed description when read in conjunction with the drawings.

BRIEF DESCRIPTION OF THE DRAWING

FIG. 1 is a perspective view of the base element of the invention in which an indeterminate length is indicated;

FIG. 2 is a perspective view of the intermediate element of the invention in which an indeterminate length is indicated;

FIG. 3 is a perspective view of the cap element of the invention in which an indeterminate length is indicated;

FIGS. 4, 5, and 6 show the sequence of installation of a plastic sheet using the elements shown in FIG. 1 and FIG. 3 with FIG. 4 showing the initial installation of the cap element, FIG. 5 showing the final position of the cap element, and FIG. 6 showing the effect of tension of the plastic sheet;

FIG. 7 shows the base element installed on a surface with a plastic sheet captivated by the cap element with the flexible spline inserted; and FIG. 8 shows the installation of FIG. 7 in which two intermediate elements have been installed.

DETAILED DESCRIPTION OF THE PREFERRED EMBODIMENT

The basic elements of my plastic film holding system of the invention are shown in FIGS. 1 through 3. FIG. 1 is the base element 10 which includes a base portion 12 having a locking spline 14 projecting upward therefrom. A plurality of holes 13 may be drilled in base portion 12 for securing to a surface. A T portion 15 is attached vertically along one edge of the base portion 12. T portion 15 includes a planar T-crossbar portion 16 having an upwardly oriented bead 17 along one edge thereof and a downwardly oriented bead 18 along the opposite edge. It may be noted that the outboard edge of T-crossbar 16 is longer than the inboard edge thereof, as will be discussed hereinbelow.

Turning to FIG. 3, the cap element 30 is shown having a planar surface 36, a long lip portion 31 defining a channel 35, and a short lip portion 33 defining a channel 37. A downwardly extending bead 34 is disposed along the inner edge of lip 31 and a symmetrical bead 32 is disposed along the edge of lip 33. A space 39 is defined by beads 32 and 34.

FIG. 2 is a perspective view of the intermediate element of my invention. As will be recognized, intermediate section 20 is in effect the cap element 30 having the T portion of base element 10 attached to the planar surface thereof. Consequently, lip 21 defines channel 25, lip 23 defines channel 27, and beads 22 and 24 define opening 29. The vertical member of the T-shaped portion 26 is at right angles to the plane of the cap portion of intermediate section 20. The T-crossbar surface 28 is equivalent to surface 16 of the base section.

Elements 10, 20, and 30 are preferably extruded from aluminum for lightness, low cost, and ease of handling. However, it will be apparent that other materials having the necessary rigidity are suitable.

Referring to FIGS. 4 through 6, the installation of a film sheet will be described and certain features of my invention explained. In FIG. 4, the edge of a plastic sheet 11 to be secured is disposed over the T-crossbar portion 16 of a base element 10, shown in cross section. A cap element 30 is placed longitudinally over the T-crossbar 16 and lip 31 is hooked over bead 17, captivating film 11 in channel 35. It will be noted that the depth of channel 35 indicated by A is approximately equal to the length of T-crossbar 16 as indicated at B. Furthermore, the width of cap element 30 is such that a gap is defined between bead 32 and bead 18. As will now be understood, cap 30 may now be pushed downward and then to the right to the position shown in FIG. 5. Advantageously, the length of lip 31 is such that bead 35 does not clear bead 17. Referring next to FIG. 6, tension T has been placed on film 11 causing cap element 30 to pivot upward and forcing bead 35 against bead 17 securely gripping film 11 therebetween.

A typical installation is shown in FIG. 7 in which base element 10 is bolted to a surface 42, and film 50 has been installed as explained with reference to FIGS. 4 through 6. A flexible spline 40 which may be formed from plastic, rubber, or the like is installed along the full length of the film holding elements 10 and 30 between locking spline 14 and lip 33. As will be understood, spline 40 serves the purpose of holding the cap 30 in place while attaching the other end of film 50 prior to tension T being placed on film 50. When tension T is applied, cap 30 will shift to the position shown in FIG. 6, with tension due to forces on the plastic film 50 increasing the gripping action of the invention.

When it is desired to remove film 50, spline 40 is stripped out, cap 30 is moved to the left and pivoted upward, releasing cap 30 from the T-crossbar 16.

When it is desired to provide multiple layers of plastic film in an installation, multiple layers may be used with only the base element 10 and cap element 30 since the gap between bead 32 and bead 18 of FIG. 4 is the only limiting factor. Thus, two or more layers can be provided depending upon the film thickness. However in such case, removal of one film while desiring to retain the other films is inconvenient. In such cases, the intermediate element 20 may be used to effectively separate several layers of film. This application is shown in FIG. 8 in which two intermediate elements 20 are stacked to provide the desired separation. Here, three films, 50, 52 and 54 have been installed with film 50 disposed on the base element 10, which film 50 captivated by channels 27a and 25a of intermediate element 20a; film 52 is captivated by channels 27b and 25b of intermediate element 20b, and film 54 is captivated by channels 37 and 35 of cap element 30. If it is desired to remove only film 54, spline 51 is removed, cap 30 is disengaged from intermediate element 20, and film 54 may then be removed without disturbing films 52 and 50.

As will now be recognized, a system for securing edges of plastic sheeting has been disclosed which provides for multiple layers and which is easily assembled and disassembled. Although specific shapes of the securing elements have been shown and described for exemplary purposes, it will be obvious for those of skill in the art to vary such shapes without departing from the spirit and scope of the invention.

We claim:

1. A device for fastening a flexible sheet to a structure comprising:

a base member having means for attachment to a structure, said base member having an elongated rigid base portion and a T-shaped portion integral with said base portion in which a planar T-crossbar portion is essentially parallel with said base portion, said T-crossbar portion having a long section and a short section thereof; and A cap member having an elongated planar surface, a first longitudinal edge of said planar surface having a first 180° lip defining a first channel, the depth of said first channel essentially that of the length of said long section of said T-crossbar portion and a second 180° lip defining a second channel having a depth essentially that of the length of said short section of said T-crossbar portion, said cap member adapted to be disposed with said long section of said T-crossbar portion within said first channel and said short section of said T-crossbar portion within said second channel with a flexible sheet captivated therebetween.

2. The device as recited in claim 1 in which said base portion of said base member includes a longitudinal locking spline adjacent to and spaced apart from said short section of said T-crossbar portion.

3. The device as recited in claim 1 in which said short section of said T-crossbar portion includes a longitudinal bead along the edge thereof.

4. The device as recited in claim 1 in which said long section of said T-crossbar portion includes a longitudinal bead along the edge thereof.

5. The device as recited in claim 2 in which said first and second lips of said cap member each includes a longitudinal bead along the edge thereof.

6. The device as recited in claim 1 in which said base member and said cap members are formed of aluminum.

7. The device as recited in claim 1 in which said base member and said cap members are formed from rigid plastic.

8. The device as defined in claim 5 which, after disposition of said cap member and said T-crossbar portion to captivate a flexible sheet therebetween, further includes a flexible spline disposed between said longitudinal locking spline and said second lip of said cap member.

9. A system for fastening multiple flexible sheets to a structure comprising:
 a base member having means for attachment to a structure, said base member having an elongated rigid base portion and a first T-shaped portion integral with said base portion in which a planar first T-crossbar portion is essentially parallel with said base portion, said first T-crossbar portion having a long section and a short section thereof;
 a cap member having an elongated planar surface, a first longitudinal edge of said planar surface having a first 180 degree lip defining a first channel, the depth of said first channel essentially that of the length of said long section of said first T-crossbar portion and a second 180 degree lip defining a second channel having a depth essentially that of the length of said short section of said first T-crossbar portion; and
 at least one intermediate member having a first cap portion having the same structure as said cap member including first and second lips thereof, a planar surface thereof and a second T-shaped portion having the same structure as said first T-shaped portion including a second T-crossbar portion thereof, said second T-crossbar portion of said intermediate member integral with said planar surface of said first cap portion of said intermediate member with said second T-crossbar portion essentially parallel with said planar surface of said first cap portion, said first cap portion disposed over said first T-crossbar portion of said base member with a first flexible sheet captivated therebetween, said cap member disposed over said second T-crossbar portion of said second T-shaped portion of said intermediate member with a second flexible sheet captivated therebetween.

10. The system as recited in claim 9 in which said planar surface of said first cap portion includes a first longitudinal locking spline adjacent to and spaced apart from said second T-crossbar portion.

11. The system as recited in claim 9 in which said T-crossbar portion includes a longitudinal bead along each longitudinal edge thereof.

12. The system as recited in claim 9 in which said base member, said cap member and said intermediate member are formed of aluminum.

13. The system as recited in claim 10 in which said base portion of said base member includes a second longitudinal locking spline adjacent to and spaced apart from said short section of said first T-crossbar portion.

14. The system as recited in claim 13 which, after disposition of said first cap portion over said first T-crossbar portion of said base member with a first flexible sheet captivated therebetween, and disposition of said cap member over said second T-crossbar portion of said intermediate member with a second flexible sheet captivated therebetween, said system further includes:
 a first flexible spline disposed between said first longitudinal locking spline and said second lip of said cap member; and
 a second flexible spline disposed between said second longitudinal locking spline and said second lip of said first cap portion of said intermediate member.

* * * * *